(12) United States Patent
Hsiung (10) Patent No.: US 8,102,472 B2
(45) Date of Patent: Jan. 24, 2012

(54) IMAGE PROCESSING APPARATUS AND METHOD FOR Y/C SEPARATION

(75) Inventor: Chia-Hao Hsiung, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 1161 days.

(21) Appl. No.: 11/902,142

(22) Filed: Sep. 19, 2007

(65) Prior Publication Data

US 2008/0074553 A1 Mar. 27, 2008

(30) Foreign Application Priority Data

Sep. 21, 2006 (TW) ................................ 95134894 A (51) Int. Cl.
*H04N 9/78* (2006.01)
*H04N 9/77* (2006.01)

(52) U.S. Cl. ...................................... 348/665; 348/663
(58) Field of Classification Search .................. 348/665, 348/663, 624; 333/167
See application file for complete search history.

(56) References Cited

U.S. PATENT DOCUMENTS

| | | | |
|---|---|---|---|
| 3,634,615 A * | 1/1972 | Sasaki et al. ................... | 348/663 |
| 4,786,963 A | 11/1988 | McNeely et al. | |
| 5,032,914 A | 7/1991 | Fujita et al. | |
| 5,103,297 A | 4/1992 | Yamade et al. | |
| 5,909,255 A | 6/1999 | Hatano et al. | |
| 6,774,954 B1 | 8/2004 | Lee | |
| 6,795,126 B1 | 9/2004 | Lee | |
| 7,110,045 B2 * | 9/2006 | Ishihara ......................... | 348/663 |
| 7,944,508 B1 * | 5/2011 | Chou ............................. | 348/624 |
| 7,969,511 B2 * | 6/2011 | Kim .............................. | 348/625 |
| 2002/0171767 A1 * | 11/2002 | Piepers ......................... | 348/607 |
| 2003/0071921 A1 | 4/2003 | Tanigawa | |
| 2004/0119892 A1 * | 6/2004 | Ishihara ........................ | 348/663 |
| 2004/0179141 A1 | 9/2004 | Topper | |
| 2006/0274204 A1 * | 12/2006 | Kimura et al. ................ | 348/558 |
| 2007/0019257 A1 * | 1/2007 | Li .................................. | 358/518 |

FOREIGN PATENT DOCUMENTS

| | | |
|---|---|---|
| JP | 2004-40291 | 2/2004 |
| JP | 2004-040291 | * 5/2004 |

OTHER PUBLICATIONS

Chua-Chin Wang, et al., Low-cost Video Decoder with 2D2L Comb Filter for NTSC Digital TVs, IEEE Transactions on Consumer Electronics, vol. 51, No. 2, May 2005, pp. 694-698.

* cited by examiner

*Primary Examiner* — Hoang-Vu A Nguyen-Ba
(74) *Attorney, Agent, or Firm* — Muncy, Geissler, Olds & Lowe, PLLC (57) ABSTRACT

An image processing apparatus includes: a cross-color detecting module for detecting whether at least one pixel carried by a composite signal has cross-color effect; and an image processing module, coupled to the cross-color detecting module, for performing a first predetermined operation or a second predetermined operation on the composite signal to generate a corresponding chrominance signal; wherein when the pixel has cross-color effect, the image processing module outputs a chrominance value of the pixel from the chrominance signal processed through the first predetermined operation, and when the pixel does not have cross-color effect, the image processing module outputs the chrominance value from the chrominance signal processed through the second predetermined operation.

23 Claims, 5 Drawing Sheets

IMAGE PROCESSING APPARATUS AND METHOD FOR Y/C SEPARATION

BACKGROUND OF THE INVENTION

1. Field of the Invention

The present invention relates to image processing, and more particularly, to Y/C separation.

2. Description of the Related Art

Figure 1:
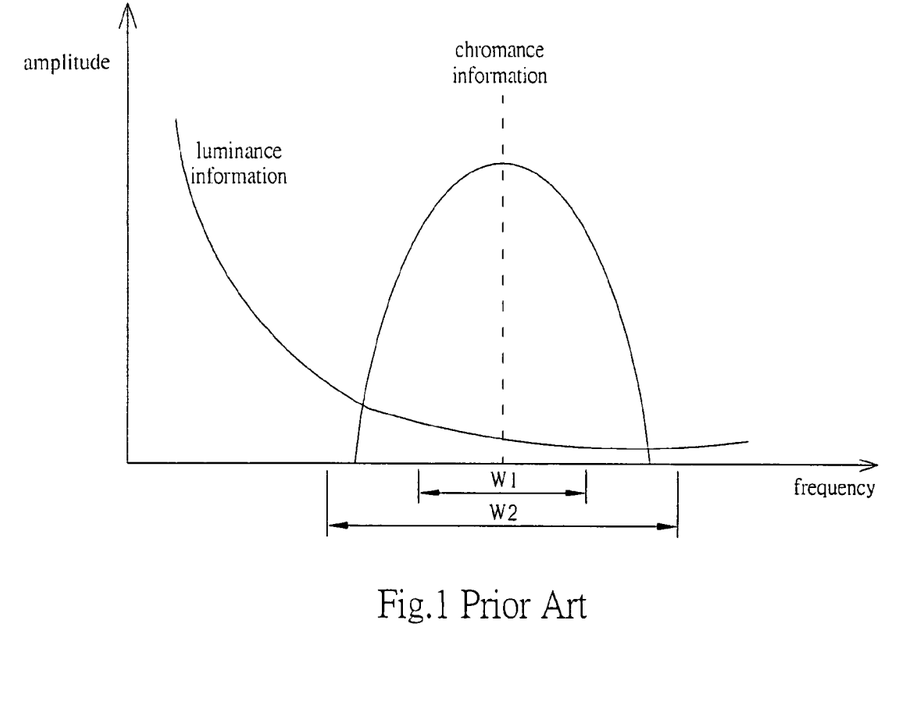
FIG. 1 is a diagram of a frequency spectrum of a composite signal.

In many applications, image data are carried by a composite signal for transmission. Please refer to FIG. 1, which is a diagram of a frequency spectrum of a composite signal. As shown in FIG. 1, the composite signal comprises luminance information and chrominance information, wherein the chrominance information is superimposed to the high frequency part of the luminance information through modulation.

After receiving the composite signal, the video decoder needs to separately extract luminance information and chrominance information from the composite signal for follow-up processing. Such an operation is then termed as luminance/chrominance separation, or Y/C separation.

In general, the above-mentioned Y/C separation embodies a filtering operation upon the composite signal such that the chrominance information can be separated from the high-frequency part of the luminance information. However, different filtering bands often result in varied filtering results. For example, in a case where the filter has narrower filtering band (such as the frequency band W1 shown in FIG. 1), when the filtered image is displayed, the boundary of the color tends to be blurred because the entirety of the chrominance information cannot be fully extracted from the composite signal. On the other hand, in a case where the filter has a wider filtering band (such as the frequency band W2 shown in FIG. 1), although the chrominance information can be fully extracted from the composite signal, the filtered image signal, which is regarded as the chrominance signal, may actually comprise not only the genuine chrominance information, but also some of the high frequency component of the luminance information. This means that some high frequency part of the luminance information is incorrectly determined as chrominance information, and such phenomenon is called as cross-color effect. Therefore, when the image is displayed, although the color boundary tends to be sharper, the above-mentioned cross-color effect introduces infidelity to the image in such a way that the displaying performance of the image deteriorates.

As a result, no matter which filtering band (such as the frequency bands W1 and W2) is applied, there is always a corresponding problem to be solved.

SUMMARY OF THE INVENTION

In view of the above-mentioned problems, an object of the invention is to provide an improved image processing apparatus and related image processing method.

According to an embodiment of the present invention, an image processing apparatus is disclosed. The image processing apparatus comprises: a cross-color detecting module, for receiving a composite signal and determining whether at least one pixel carried by the composite signal has cross-color effect; and an image processing module, coupled to the cross-color detecting module, for receiving the composite signal and performing a first predetermined operation or a second predetermined operation on the composite signal to generate a corresponding chrominance signal; wherein when the pixel has cross-color effect, the image processing module outputs a chrominance value corresponding to the pixel from the chrominance signal processed through the first predetermined operation, and when the pixel does not have cross-color effect, the image processing module outputs the chrominance value from the chrominance signal processed through the second predetermined operation.

According to another embodiment of the present invention, an image processing method is disclosed. The image processing method comprises: determining whether at least one pixel carried by a composite signal has cross-color effect; performing a first predetermined operation or a second predetermined operation on the composite signal to generate a corresponding chrominance signal; and when the pixel has cross-color effect, outputting a chrominance value corresponding to the pixel from the chrominance signal processed through the first predetermined operation, and when the pixel does not have cross-color effect, outputting the chrominance value from the chrominance signal processed through the second predetermined operation.

The present invention image processing apparatus and related image processing method can perform adaptive filtering or amplifying operations on the composite signal according to the cross-color condition of each pixel carried by the composite signal. In this way, not only the sharpness of the color of the entire image can be maintained, the purpose of eliminating the cross-color effect can also be achieved. Therefore, the present invention can result in better displaying performance.

DETAILED DESCRIPTION OF THE INVENTION

Figure 2:
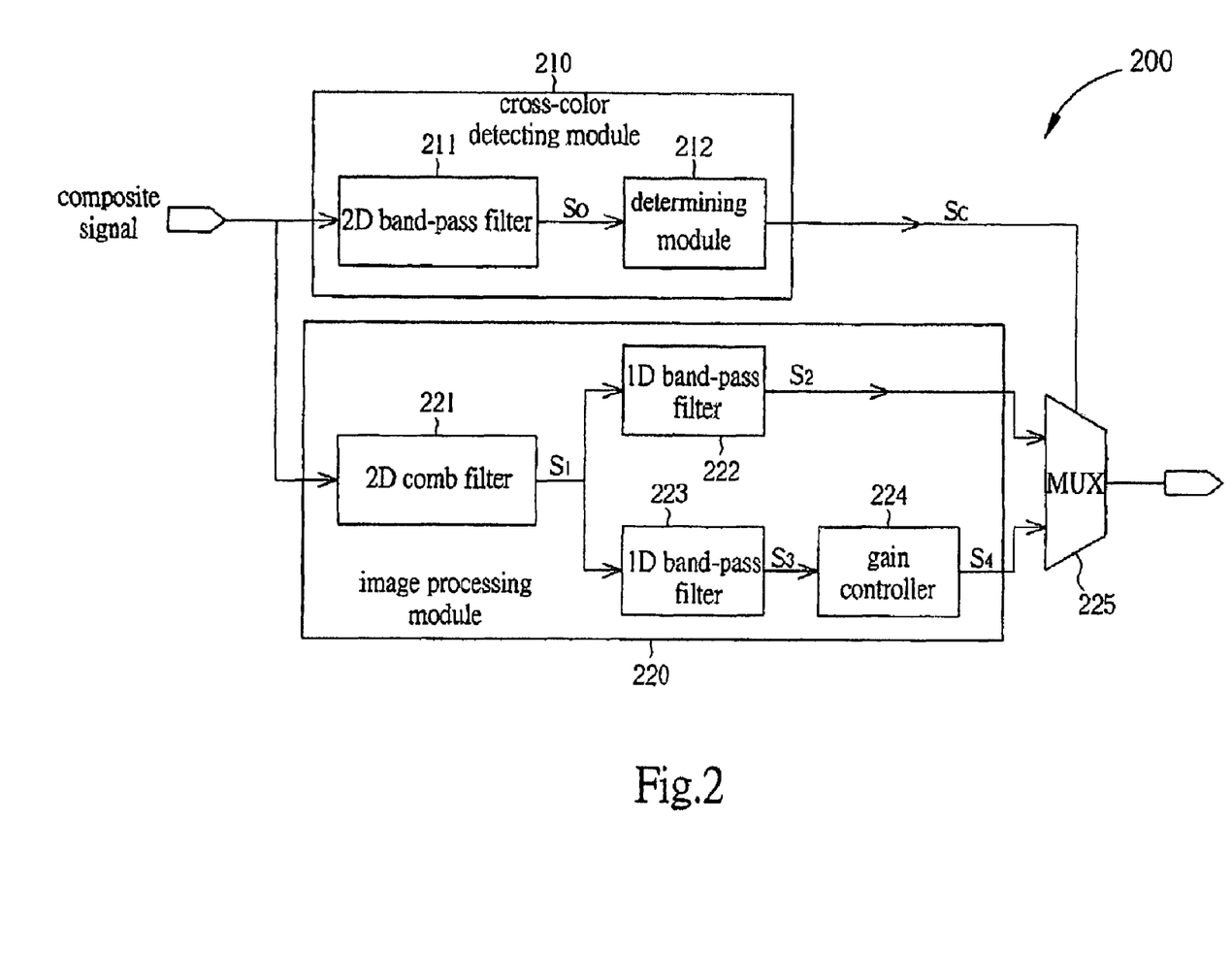
FIG. 2 is a block diagram of an image processing apparatus according to a first embodiment of the present invention.

Please refer to FIG. 2, which is a block diagram of an image processing apparatus 200 according to a first embodiment of the present invention. As shown in FIG. 2, the image processing apparatus 200 comprises a cross-color detecting module 210 and an image processing module 220. Please note that since the electrical connections of the above-mentioned components are clearly shown in FIG. 2, detailed descriptions thereof are thus herein omitted. The operations and functions of these components will be illustrated in the following disclosure.

As mentioned previously, the cross-color effect often introduces infidelity to the displayed images. Moreover, as is known, the composite signal carries image data of all pixels of the image. Therefore, in this embodiment, the cross-color detecting module 210 is first utilized for analyzing the composite signal to find out pixels having cross-color effect. Then the image processing module 220 can perform various operations on the composite signal, and selectively outputs one of the pixel values resulting from the various operations according to the detecting results of the cross-color detecting module 210. For example, for a pixel having cross-color effect, the image processing module 220 can output a pixel value, which has been processed through a first operation. On the other hand, for other pixels which do not have cross-color effect, the image processing module 220 can output the pixel values, which are processed through a second operation. The detailed operations of the cross-color detecting module 210 and the image processing module 220 are illustrated in the following disclosure.

As shown in FIG. 2, the cross-color detecting module 210 comprises a 2D band-pass filter 211 and a determining module 212. Please refer to FIG. 3, which is a simplified exemplary diagram of a filtering band of the 2D band-pass filter 211 shown in FIG. 2. Please note that in FIG. 3, a 1D filtering band is shown as a simplified representation for analogizing the filtering band of the 2D band-pass filter 211.

Figure 3:
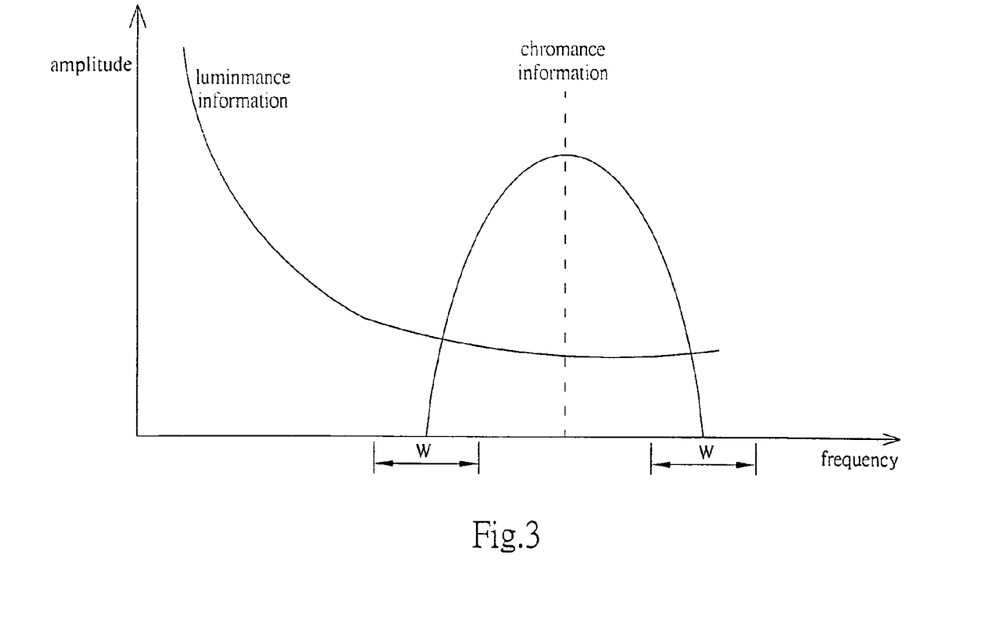
FIG. 3 is an exemplary diagram of a filtering band of the 2D band-pass filter shown in FIG. 2.

In this embodiment, the 2D band-pass filter 211 performs the filtering operation on the composite signal according to the filtering band W shown in FIG. 3 to generate a filtered signal $S_0$.

Please note that the filtering band W is utilized to emphasize the non-ideal characteristic of the filter. In other words, the present invention selects a filtering band, which can make the cross-color effect more apparent. However, the filtering band W does not have more limitations; for example, designers can choose the position and bandwidth of the filtering band according to various requirements such that the present invention can more effectively detect pixels having cross-color effect.

As mentioned previously, the cross-color effect occurs due to the non-ideal characteristic of the filter, and the luminance information is incorrectly determined as chrominance information. Therefore, for a specific filtering band, if the ratio of the luminance information to the chrominance information in the specific filtering band is larger, the cross-color effect in the filtered signal becomes more apparent. From FIG. 3, it can be seen that the energy of the chrominance information in the filtering band W is weaker, i.e., a situation where the ratio of the luminance information to the chrominance information is larger as described above, so theoretically speaking, after the filtering operation the generated chrominance value is more significantly affected by the luminance information.

And then, the determining module 212 detects those pixels carried by the composite signal, which exhibit cross color effect, according to the filtered signal $S_0$. As is known, the composite signal carries data of a plurality of image fields, among which there may be some pixels or regions having cross-color effect. Therefore, the determining module 212 detects whether a pixel has cross-color effect according to the filtering result of the composite signal. For example, for each pixel, the filtered composite signal $S_0$ has a corresponding pixel value (chrominance value), and in this embodiment the determining module 212 compares said pixel value of each pixel with a predetermined threshold value to check whether the pixel has cross-color effect. Furthermore, the determining module 212 outputs a control signal Sc according to the cross-color condition of each pixel.

Moreover, as mentioned previously, because the cross-color effect in the filtered signal $S_0$ is more apparent; that is, the chrominance value of each pixel of the filtered signal $S_0$ is more significantly affected by the luminance information, if the filtered signal $S_0$ is used to detect the cross-color effect, a better determining result can be obtained. In addition, as mentioned previously, because the chrominance value is more seriously influenced by the luminance information, cross-color effect can be determined by comparing the chrominance value of a certain pixel with a predetermined threshold value. If the chrominance value of the pixel is larger than the predetermined value, the determining module 212 determines that the pixel has cross-color effect.

However, please note that the present invention does not impose limitation on the predetermined threshold value. In this embodiment, the predetermined threshold value is utilized as a determination accordance of determining whether a pixel has cross-color effect, such that the present invention can perform different operations according to the cross-color condition of the pixel. Therefore, the designer can set the predetermined threshold value according to design requirements or particular image characteristics, to render better image displaying quality. Furthermore, other known or novel methods for determining the degree of cross-color effect of a pixel can be implemented in the cross-color detecting module.

On the other hand, the image processing module 220 is utilized to perform Y/C separation on the composite signal. As shown in FIG. 2, the image processing module 220 comprises a 2D comb filter 221, 1D band-pass filters 222 and 223, a gain controller 224, and a multiplexer (MUX) 225. Please note that, in this embodiment the filtering band of the 2D comb filter 221 cannot change according to the above-mentioned determining result of the cross-color determining module 210; that is, the 2D comb filter 221 in this embodiment can be regarded as an unalterable given component, and therefore is used to perform a preliminary Y/C separation on the composite signal. In other words, the 2D comb filter 221 makes use of the characteristic that in the composite signal the phases of the Y component (luminance information) and C component (chrominance information) vary periodically, in performing Y/C separation. For example, in NTSC system, the phases of the Y component and C component periodically change every two scan lines; or in PAL system, the phases of the Y component and C component periodically change every four scan lines. With the above-mentioned characteristic, the 2D comb filter 221 can perform a filtering operation (the above-mentioned Y/C separation) on the composite signal to initially extract the C component and generate a filtered signal $S_1$. Because the technique of utilizing the 2D comb filtering operation to extract the C component has been well known by those skilled in the art, further illustration is omitted herein.

Then, the filtered signal S1 (the extracted chrominance signal) outputted from the 2D comb filter, is transferred to the 1D band-pass filters 222 and 223 to respectively perform a further image processing (for example, the above-mentioned first operation and second operation), so as to generate filtered signals S2 and S3, respectively. In this embodiment, the filtering band of the band-pass filter 222 is wider than that of the band-pass filter 223; for example, the filtering band of the band-pass filter 223 can correspond to W1 shown in FIG. 1, and the filtering band of the band-pass filter 222 can correspond to W2 shown in FIG. 1. As mentioned previously, each of the band-pass filters 222 and 223 may impose a different filtering effect upon the composite signal. In other words, for the image signal $S_3$ processed through the band-pass filter 223, the cross-color effect is not apparent but the color boundary is blurred; on the other hand, for the image signal $S_2$ processed through the band-pass filter 222, the color boundary is sharper, but the cross-color effect becomes more serious.

The gain controller 224 is connected after the 1D band-pass filter 223, for reducing gains of various color components of the filtered signal $S_3$, to further reduce the cross color effect of the image signal $S_3$ and generate an adjusted signal $S_4$. Here, the function and operation of the gain controller 224 has been well known, and is thus omitted herein.

From the above disclosure, the composite signal is processed by two different band-pass filters 222 and 223, and the multiplexer 225 is utilized to select the image signal $S_2$ or the image signal $S_4$ according to the control signal Sc outputted by the cross-color detecting module 210. Please note that in this embodiment, the cross-color detecting module 210 performs cross-color detection on a pixel-by-pixel basis; that is, the cross-color detecting module 210 takes a pixel as a unit to detect the cross-color effect. In other words, if the cross-color detecting module 210 determines that a pixel in the composite signal has cross-color effect, the cross-color detecting module 210 generates the control signal Sc to control the multiplexer 225 in order to select a corresponding pixel from the image signal $S_4$, where the cross-color effect of the corresponding pixel is less serious. On the other hand, if the cross-color detecting module 210 determines that a pixel in the composite signal does not has cross-color effect, the cross-color detecting module 210 generates the control signal Sc to control the multiplexer 225 in order to select a corresponding pixel from the image signal $S_2$, where the corresponding pixel can have a sharper color boundary.

Please note that, the gain controller 224 is utilized to further reduce the possible cross color effect of the image signal $S_3$. However, in this embodiment, the gain controller 224 is an optional component; that is, the gain controller 224 is regarded as a preferred embodiment, but not a limitation of the present invention. In other words, the first embodiment of the present invention can be implemented without the gain controller 224.

Please note that in the above-mentioned embodiment, the band-pass filters 222 and 223 are both 1D band-pass filters. However, if supported by hardware architecture (for example, if there are enough line buffers), the band-pass filters 222 and 223 can as well be implemented as 2D band-pass filters, which implementation also conforms to the spirit of the present invention.

Figure 4:
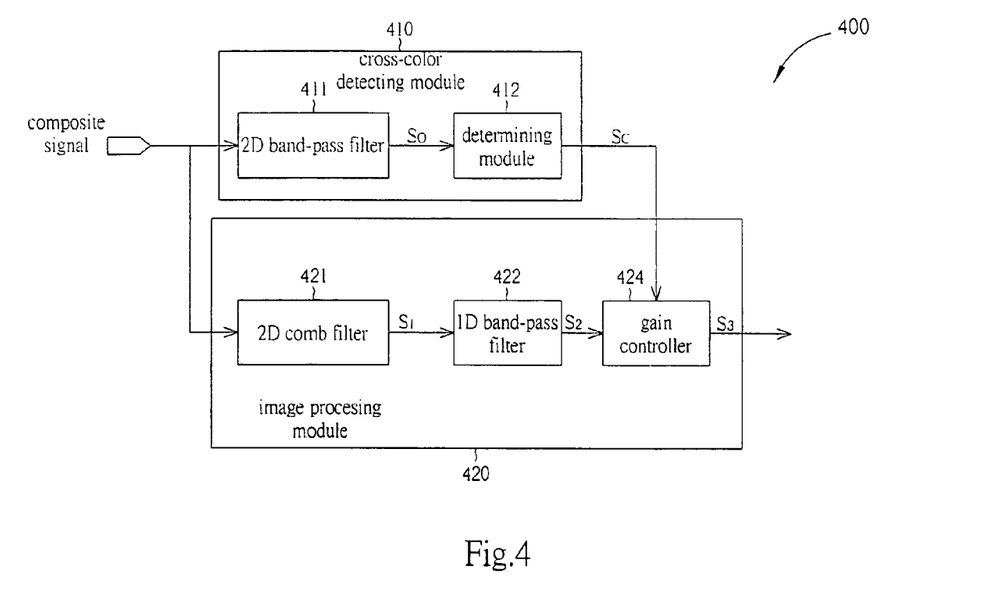
FIG. 4 is a block diagram of an image processing apparatus according a second embodiment of the present invention.

Please refer to FIG. 4, which is a second embodiment of an image processing apparatus 400 according to the present invention. As shown in FIG. 4, the image processing apparatus 400 comprises a cross-color detecting module 410 and an image processing module 420. The cross-color detecting module 410 comprises a 2D band-pass filter 411 and a determining module 412. The image processing module 420 comprises a 2D comb filter 421, a 1D band-pass filter 422, and a gain controller 424. Because the electrical connections among the above components are clearly shown in FIG. 4, detailed description thereof are thus omitted herein. In addition, the function and operation of the cross-color detecting module 410 is the same as the cross-color detecting module 210 shown in FIG. 2, and further illustration is thus omitted herein.

The image processing module 420 is utilized to perform Y/C separation on the composite signal. In this embodiment, the 2D comb filter 421 is the same as the above-mentioned 2D comb filter 221, for initially extracting the C component from the composite signal to generate a filtered signal $S_1$.

And then, filtered signal S1 (the extracted chrominance signal), outputted from the 2D comb filter 421, is transferred to the 1D band-pass filter 422. The band-pass filter 422 further performs a filtering operation on the filtered signal $S_1$ to generate another filtered signal $S_2$. In this embodiment, the filtering band of the band-pass filter 422 can correspond to W2 shown in FIG. 1. As mentioned previously, the image signal $S_2$, outputted by the band-pass filter 422, has a sharper color boundary, but with more serious cross-color effect.

The gain controller 424 is then utilized to selectively reduce the gains of color components of a plurality of pixels inside the filtered signal $S_2$ according to the control signal Sc, to suppress the cross-color effect such that an adjusted signal $S_3$ is generated. In other words, in this embodiment, when the cross-color detecting module 410 determines that a pixel inside the composite signal has cross-color effect, the cross-color detecting module 410 generates a control signal Sc to control the gain controller, so as to reduce the gains of the color components of the pixel such that the cross-color effect is suppressed. On the other hand, if the cross-color detecting module 410 determines that a pixel inside the composite signal does not have cross-color effect, the cross-color detecting module 410 generates the control signal Sc to control the gain controller 424, so as to directly output the pixel without reducing the gains.

Therefore, in the adjusted signal $S_3$, only those pixels having cross-color effect are processed by the gain controller 424. The other pixels, which do not have cross-color effect, are directly outputted without the processing of the gain controller. In this way, the adjusted signal $S_3$ not only has a sharp color boundary, but also suppressed cross-color effect. Therefore, the present invention can have a better image display quality.

Figure 5:
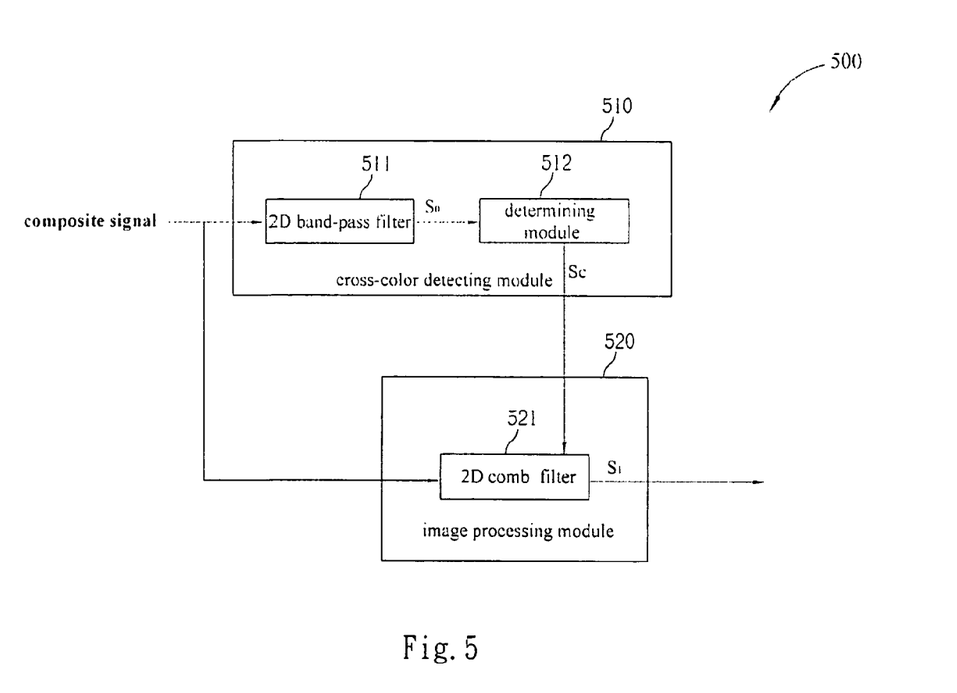
FIG. 5 is a block diagram of an image processing apparatus according to a third embodiment of the present invention.

Please refer to FIG. 5, which is a block diagram of a third embodiment of an image processing apparatus 500 according to the present invention. As shown in FIG. 5, the image processing apparatus 500 comprises a cross-color detecting module 510 and an image processing module 520. The cross-color detecting module 510 comprises a 2D band-pass filter 511 and a determining module 512. The image processing module 520 comprises a 2D comb filter 521 because the electrical connections among the above-mentioned components have been clearly shown in FIG. 5, detailed description thereof is thus omitted herein. In addition, the function and operation of the cross-color detecting module 510 is the same as the cross-color detecting module 210 shown in FIG. 2, and further illustration is omitted herein.

Please note that the 2D comb filter 521 is different from the 2D comb filter 221 shown in FIG. 2. In this embodiment, the filtering band of the 2D comb filter 521 is adjustable. In other words, the 2D comb filter 521 can select an appropriate filtering band according to the control signal Sc outputted by the cross-color detecting module 510, to perform the filtering operation on the composite signal such that a filtered signal $S_1$ is generated.

For example, the filtering band of the 2D comb filter 521 can correspond to W1 or W2 shown in FIG. 1; that is, when the cross-color detecting module 510 determines that a pixel has cross-color effect, the cross color detecting module 510 generates a control signal Sc to control the 2D comb filter 521 to utilize the filtering band W1, such that the cross-color effect can be suppressed. On the other hand, when the cross color detecting module 510 determines that a pixels does not have cross-color effect, the cross-color detecting module 510 generates a control signal Sc to control the 2D comb filter 521 to utilize the filtering band W2, such that the color boundary can be sharp).

In this way, the filtered signal $S_1$ not only has a sharp color boundary, but also suppressed cross-color effect. Therefore, the present invention can have a better image display quality.

Surely, the image processing module 520 can further comprise a gain controller to further suppress the cross-color effect, which alteration also conforms to the spirit of the present invention.

In contrast to the prior art, the present invention image processing apparatus and related image processing method can perform different filtering operations or gain operations on the composite signal according to the cross-color condition of each pixel carried by the composite signal. In this way, not only the sharpness of the color of the entire image can be maintained, the purpose of eliminating the cross-color effect can also be achieved. Therefore, the present invention can have a better displaying performance.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An image processing apparatus comprising:
   a cross-color detecting module, for receiving a composite signal and determining whether at least one pixel carried by the composite signal has cross-color effect; and
   an image processing module, coupled to the cross-color detecting module, for receiving the composite signal and performing a first predetermined operation or a second predetermined operation on the composite signal to generate a corresponding chrominance signal;
   wherein when the pixel has cross-color effect, the image processing module outputs a chrominance value corresponding to the pixel from the chrominance signal processed through the first predetermined operation, and when the pixel does not have cross-color effect, the image processing module outputs the chrominance value from the chrominance signal processed through the second predetermined operation;
   wherein the image processing module comprises:
   a comb filter, capable of utilizing a first filtering band or a second filtering band to perform a filtering operation, wherein the second filtering band is wider than the first filtering band; and
   wherein when the pixel has cross-color effect, the comb filter utilizes the first filtering band for performing the filtering operation on the composite signal to perform the first predetermined operation, and when the pixel does not have cross-color effect, the comb filter utilizes the second filtering band for performing the filtering operation on the composite signal to perform the second predetermined operation.

2. The image processing apparatus of claim 1, wherein the comb filter is a 2-dimensional comb filter and a filtering band of the 2-dimensional comb filter is adjustable.

3. The image processing apparatus of claim 1, wherein the cross-color detecting module comprises:
   a band-pass filter, for receiving the composite signal and performing a band-pass filtering operation on the composite signal to generate a filtered signal; and
   a determining module, coupled to the band-pass filter, for receiving the filtered signal and determining whether the pixel has cross-color effect according to a pixel value corresponding to the pixel in the filtered signal.

4. The image processing apparatus of claim 3, wherein the band-pass filter is a 2-dimensional band-pass filter.

5. The image processing apparatus of claim 3, wherein the pixel value is a chrominance value.

6. The image processing apparatus of claim 5, wherein the determining module compares the chrominance value corresponding to the pixel inside the filtered signal with a predetermined threshold value, if the chrominance value corresponding to the pixel is larger than the predetermined value, the determining module determines that the pixel has cross-color effect.

7. An image processing apparatus comprising:
   a cross-color detecting module, for receiving a composite signal and determining whether at least one pixel carried by the composite signal has cross-color effect; and
   an image processing module, coupled to the cross-color detecting module, for receiving the composite signal and performing a first predetermined operation and a second predetermined operation on the composite signal to generate a corresponding chrominance signal;
   wherein when the pixel has cross-color effect, the image processing module outputs a chrominance value corresponding to the pixel from the chrominance signal processed through the first predetermined operation, and when the pixel does not have cross-color effect, the image processing module outputs the chrominance value from the chrominance signal processed through the second predetermined operation;
   wherein the image processing module comprises:
   a comb filter, for receiving the composite signal and performing a first filtering operation on the composite signal to generate a first filtered signal;
   a first band-pass filter, coupled to the comb filter, for receiving the first filtered signal and performing a second filtering operation on the composite signal to perform the first predetermined operation; and
   a second band-pass filter, coupled to the comb filter, for receiving the first filtered signal and performing a third filtering operation on the composite signal to perform the second predetermined operation;
   wherein a filtering band of the second band-pass filter is wider than a filtering band of the first band-pass filter.

8. The image processing apparatus of claim 7, wherein the comb filter is a 2-dimensional comb filter.

9. The image processing apparatus of claim 7, wherein each of the first band-pass filter and the second band-pass filter is a 1-dimensional band-pass filter.

10. The image processing apparatus of claim 7, wherein the image processing module further comprises:
    a multiplexer, coupled to the first band-pass filter, the second band-pass filter, and the cross-color detecting module;
    wherein the cross-color detecting module generates a control signal to the multiplexer according to its detecting result such that the multiplexer selects an output of the first band-pass filter to output the chrominance value corresponding to the pixel when the pixel has cross-color effect, and selects an output of the second band-pass filter to output the chrominance value corresponding to the pixel when the pixel does not have cross-color effect.

11. The image processing apparatus of claim 7, wherein the image processing module further comprises:
    a gain controller, coupled to the first band-pass filter, for receiving an output signal from the first band-pass filter and adjusting gains of color components of the output signal.

12. The image processing apparatus of claim 11, wherein the image processing module further comprises:
    a multiplexer, coupled to the gain controller, the second band-pass filter, and the cross-color detecting module;
    wherein the cross-color detecting module generates a control signal to the multiplexer according to its detecting result such that the multiplexer selects an output of the gain controller to output the chrominance value corresponding to the pixel when the pixel has cross-color effect, and selects an output of the second band-pass filter to output the chrominance value corresponding to the pixel.

13. An image processing apparatus comprising:
a cross-color detecting module, for receiving a composite signal and determining whether at least one pixel carried by the composite signal has cross-color effect; and
an image processing module, coupled to the cross-color detecting module, for receiving the composite signal to generate a corresponding chrominance signal;
wherein the image processing module comprises:
a comb filter, for receiving the composite signal and performing a filtering operation on the composite signal to generate a first filtered signal;
a first band-pass filter, coupled to the comb filter, for receiving the first filtered signal and performing a filtering operation on the first filtered signal to generate a second filtered signal; and
a gain controller, coupled to the first band-pass filter and the cross color detecting module, for receiving the second filtered signal to adjust gains of color components of the pixel in the second filtered signal when the pixel has cross-color effect, and to directly output the pixel in the second filtered signal when the pixel does not have cross-color effect.

14. The image processing apparatus of claim 13, wherein the comb filter is a 2-dimensional comb filter.

15. The image processing apparatus of claim 13, wherein the first band-pass filter is a 1-dimensional band-pass filter.

16. The image processing apparatus of claim 13, being utilized in a video decoder.

17. An image processing method comprising:
determining whether at least one pixel carried by a composite signal has cross-color effect;
performing a first predetermined operation or a second predetermined operation on the composite signal to generate a corresponding chrominance signal; and
when the pixel has cross-color effect, outputting a chrominance value corresponding to the pixel from the chrominance signal processed through the first predetermined operation, and when the pixel does not have cross-color effect, outputting the chrominance value from the chrominance signal processed through the second predetermined operation;
wherein the step of performing the first predetermined operation or the second predetermined operation to generate a corresponding chrominance signal comprises:
providing a comb filter, capable of utilizing a first filtering band or a second filtering band to perform a filtering operation, wherein the second filtering band is wider than the first filtering band; and
when the pixel has cross-color effect, utilizing the comb filter to use the first filtering band for performing the filtering operation on the composite signal to perform the first predetermined operation, and when the pixel does not have cross-color effect, utilizing the comb filter to use the second filtering band for performing the filtering operation on the composite signal to perform the second predetermined operation.

18. The image processing method of claim 17, wherein the comb filter is a 2-dimensional comb filter and a filtering band of the 2-dimensional comb filter is adjustable.

19. The image processing method of claim 17, wherein the step of determining whether the pixel carried by the composite signal has cross-color effect comprises:
utilizing a band-pass filter to perform a band-pass filtering operation on the composite signal to generate a filtered signal; and
determining whether the pixel has cross-color effect according to a pixel value corresponding to the pixel in the filtered signal.

20. The image processing method of claim 19, wherein the step of determining whether the pixel has cross-color effect comprises:
comparing a chrominance value corresponding to the pixel inside the filtered signal with a predetermined threshold value, if the chrominance value corresponding to the pixel is larger than the predetermined value, then determining that the pixel has cross-color effect.

21. An image processing method comprising:
determining whether at least one pixel carried by a composite signal has cross-color effect;
performing a first predetermined operation and a second predetermined operation on the composite signal to generate a corresponding chrominance signal; and
when the pixel has cross-color effect, outputting a chrominance value corresponding to the pixel from the chrominance signal processed through the first predetermined operation, and when the pixel does not have cross-color effect, outputting the chrominance value from the chrominance signal processed through the second predetermined operation;
wherein the step of performing the first predetermined operation or the second predetermined operation on the composite signal to generate the corresponding chrominance signal comprises:
utilizing a comb filter to perform a first filtering operation on the composite signal to generate a first filtered signal;
utilizing a first band-pass filter to perform a second filtering operation on the composite signal to perform the first predetermined operation; and
utilizing a second band-pass filter to perform a third filtering operation on the composite signal to perform the second predetermined operation;
wherein a filtering band of the second band-pass filter is wider than a filtering band of the first band-pass filter.

22. The image processing method of claim 21, wherein the step of performing the first predetermined operation and the second predetermined operation on the composite signal to generate the corresponding chrominance signal further comprises:
utilizing a gain controller to adjust gains of color components of an output signal from the first band-pass filter.

23. An image processing method comprising:
determining whether at least one pixel carried by a composite signal has cross-color effect; and
generating a corresponding chrominance signal according to the composite signal;
wherein the step of generating the corresponding chrominance signal comprises:
utilizing a comb filter for performing a filtering operation on the composite signal to generate a first filtered signal;
utilizing a first band-pass filter for performing a filtering operation on the first filtered signal to generate a second filtered signal; and
utilizing a gain controller for adjusting gains of color components of the pixel in the second filtered signal when the pixel has cross-color effect, and for directly outputting the pixel in the second filtered signal when the pixel does not have cross-color effect.

* * * * *